United States Patent
Liu et al.

(10) Patent No.: US 12,120,630 B2
(45) Date of Patent: Oct. 15, 2024

(54) POSITION PREDICTION METHOD AND APPARATUS, NETWORK ELEMENT, BASE STATION, AND STORAGE MEDIUM

(71) Applicant: ZTE CORPORATION, Shenzhen (CN)

(72) Inventors: Zhuang Liu, Shenzhen (CN); Yin Gao, Shenzhen (CN); Jiajun Chen, Shenzhen (CN); Dapeng Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 366 days.

(21) Appl. No.: 17/758,107

(22) PCT Filed: Nov. 13, 2020

(86) PCT No.: PCT/CN2020/128520
§ 371 (c)(1),
(2) Date: Jun. 28, 2022

(87) PCT Pub. No.: WO2021/139398
PCT Pub. Date: Jul. 15, 2021

(65) Prior Publication Data
US 2023/0064287 A1 Mar. 2, 2023

(30) Foreign Application Priority Data
Jan. 10, 2020 (CN) .......................... 202010026086.0

(51) Int. Cl.
*H04W 64/00* (2009.01)
*H04W 24/10* (2009.01)
(52) U.S. Cl.
CPC ......... *H04W 64/003* (2013.01); *H04W 24/10* (2013.01)

(58) Field of Classification Search
CPC .... H04W 24/10; H04W 64/00; H04W 64/003
See application file for complete search history.

(56) References Cited

U.S. PATENT DOCUMENTS

2012/0015657 A1* 1/2012 Comsa .................. H04L 5/0048
455/456.6
2012/0083263 A1 4/2012 Kim et al.

FOREIGN PATENT DOCUMENTS

| CN | 105992252 A | 10/2016 |
|----|-------------|---------|
| CN | 103327441 B | 4/2018 |

(Continued)

OTHER PUBLICATIONS

3GPP Technical Specification Group Radio Access Network. "Position enhancement for IMM MDT," 3GPP TSG-RAN WG2 Meeting #76, Nov. 14-18, 2011, pp. 1-4.

(Continued)

*Primary Examiner* — Nader Bolourchi
(74) *Attorney, Agent, or Firm* — Vivacqua Crane, PLLC (57) ABSTRACT

Disclosed are a location prediction method and apparatus, a network element, a base station and a non-transitory computer-readable storage medium. The position prediction method may include: receiving, by a location service network element, a Minimization of Drive Tests (MIDT) measurement information message sent by a base station, wherein the location service network element is a separate network element or a network element inside the base station, and the MDT measurement information message carries history location measurement information of at least one user equipment (UE); determining, by the location service network element, predicted location information of the at least one UE for a first time point or a first time period according to the history location measurement information of the at least one UE; and sending, by the location service (Continued)

network element, the predicted location information to the base station.

19 Claims, 3 Drawing Sheets

(56) References Cited

FOREIGN PATENT DOCUMENTS

| | | |
|---|---|---|
| CN | 108303093 A | 7/2018 |
| CN | 109996168 A | 7/2019 |
| CN | 111901827 A | 11/2020 |
| WO | 2011085238 A2 | 7/2011 |

OTHER PUBLICATIONS

International Searching Authority. International Search Report and Written Opinion for PCT Application No. PCT/CN2020/128520 and English translation, mailed Jul. 26, 2021, pp. 1-10.

3GPP Technical Specification Group Radio Access Network. "Running CR to Introduce NR MDT for RAN Data Collection and Utilization," 3GPP TSG-RAN WG2 Meeting #108, Nov. 18-22, 2019, pp. 1-33.

European Patent Office. Extended European Search Report for EP Application No. 20912510.3, mailed Dec. 18, 2023, pp. 1-11.

\* cited by examiner

POSITION PREDICTION METHOD AND APPARATUS, NETWORK ELEMENT, BASE STATION, AND STORAGE MEDIUM

CROSS-REFERENCE TO RELATED APPLICATION

This application is a national stage filing under 35 U.S.C. § 371 of international application number PCT/CN2020/128520, filed on Nov. 13, 2020, which claims priority to Chinese patent application No. 202010026086.0 filed on Jan. 10, 2020. The contents of these applications are incorporated herein by reference in their entirety.

TECHNICAL FIELD

The present disclosure relates to the field of communications technologies, in particular, to a location prediction method and apparatus, a network element, a base station, and a non-transitory computer-readable storage medium.

BACKGROUND

Minimization of Drive Tests (MDT) is an automated drive test technology introduced in the 3rd Generation Partnership Project (3GPP) for the Long Term Evolution (LTE) system to collect and report measurement data for common users or commercial terminal devices through network configurations. The principle of MDT is that as long as a user terminal device enables Global Positioning System (GPS) to support an MDT function, the terminal device can automatically report MDT data including user location information to a base station.

However, at present, an MDT measurement report only includes history location information at multiple time points for the GPS, and does not include historical and original measurement information at multiple time points that can be used for location measurement. If a terminal device does not support GPS or does not enable the GPS, history location information of the terminal device cannot be obtained. In addition, in an existing MDT technology, obtained historical GPS location information of the terminal device is used only to obtain reception quality of the terminal device at different locations for analyzing a coverage blind area.

SUMMARY

An embodiment of the present disclosure provides a location prediction method, which may include:
receiving, by a location service network element, MDT measurement information message sent by a base station, where the location service network element is a separate network element or a network element inside the base station, and the MDT measurement information message carries history location measurement information of at least one user equipment (UE); determining, by the location service network element, predicted location information of the at least one UE for a first time point or a first time period according to the history location measurement information of the at least one UE; and sending, by the location service network element, the predicted location information to the base station.

An embodiment of the present disclosure further provides a location prediction method, which may include:
sending, by a base station, MDT measurement activation information to at least one determined UE, where the MDT measurement activation information is used to instruct the at least one UE to perform location measurement; receiving, by the base station, an MDT measurement report sent by the at least one UE according to the MDT measurement activation information, where the MDT measurement report includes history location measurement information of the at least one UE; sending, by the base station, the history location measurement information of the at least one UE to a location service network element through an MDT measurement information message, where the location service network element is a separate network element or a network element inside the base station; and receiving, by the base station, predicted location information of the at least one UE for a first time point or a first time period sent by the location service network element according to the history location measurement information.

An embodiment of the present disclosure further provides a location prediction apparatus, which may include:
a receiving module configured to receive an MDT measurement information message sent by a base station, where the location prediction apparatus may be a separate apparatus or an apparatus inside the base station, and the MDT measurement information message carries history location measurement information of at least one UE; a determining module configured to determine predicted location information of the at least one UE for a first time point or a first time period according to the history location measurement information of the at least one UE; and a sending module configured to send the predicted location information to the base station.

An embodiment of the present disclosure further provides a location prediction apparatus, which may include:
a sending module configured to send MDT measurement activation information to at least one determined UE, where the MDT measurement activation information is used to instruct the at least one UE to perform location measurement; and a receiving module configured to receive an MDT measurement report sent by the at least one UE according to the MDT measurement activation information, where the MDT measurement report includes history location measurement information of the at least one UE. The sending module is further configured to send the history location measurement information of the at least one UE to a location service network element through an MDT measurement information message, where the location service network element is a separate network element or a network element inside the location prediction apparatus. The receiving module is further configured to receive predicted location information of the at least one UE for a first time point or a first time period sent by the location service network element according to the history location measurement information.

An embodiment of the present disclosure further provides a network element, which may include: a memory, a processor, and a computer program stored in the memory and executable by the processor, where the processor implements the location prediction method according to the embodiment of the present disclosure when executing the computer program.

An embodiment of the present disclosure further provides A base station, which may include: a memory, a processor, and a computer program stored in the memory and executable by the processor, where the processor implements the location prediction method according to the embodiment of the present disclosure when executing the computer program.

An embodiment of the present disclosure further provides a non-transitory computer-readable storage medium storing a computer program, where the computer program, when executed by a processor, implements the location prediction method provided by the embodiment of the present disclosure.

An embodiment of the present disclosure further provides a non-transitory computer-readable storage medium storing a computer program, where the computer program, when executed by a processor, causes the processor to implement the location prediction method provided by the embodiment of the present disclosure.

DETAILED DESCRIPTION

The embodiments of the present disclosure will be described below with reference to the accompanying drawings.

In addition, in the embodiments of the present disclosure, Words such as "optionally" or "example" are used for example, illustration or description. Words such as "optionally" or "example" are used to present relevant concepts in a specific manner. Moreover, "first", "second", and "third" in the embodiments of the present disclosure are only used to distinguish between different concepts, messages, and the like, and are not used to limit the order.

Figure 1:
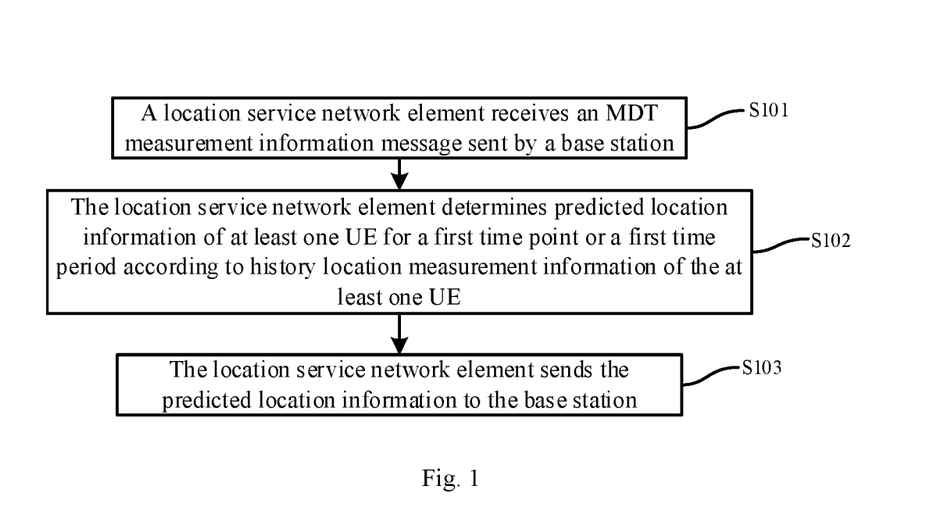
FIG. 1 is a flowchart of a location prediction method according to an embodiment.

FIG. 1 is a flowchart of a location prediction method according to an embodiment of the present disclosure. The method may be applied to a location service network element. As shown in FIG. 1, the method includes the following steps.

At S101, a location service network element receives an MDT measurement information message sent by a base station.

In an embodiment of the present disclosure, the location service network element may be a separate network element independent of the base station, or may be a network element disposed inside the base station.

When the location service network element is a separate network element, implementation of step S101 may be that the location service network element receives the MDT measurement information message sent by the base station through an interface between the location service network element and the base station. When the location service network element is a network element inside the base station, the implementation of step S101 may be that the location service network element receives, through an interface inside the base station, the MDT measurement information message sent by the base station.

The MDT measurement information message carries history location measurement information of at least one UE. The history location measurement information may include at least one of the following information: latitude and longitude coordinates for at least one time point, an identifier of a connected cell for at least one time point, a pilot fingerprint measurement value for at least one time point, an identifier of a wireless local area network recorded for at least one time point, a difference between arrival times of positioning reference signals in a plurality of cells for at least one time point, and an identifier of a connected beam for the connected cell for at least one time point.

At S102, the location service network element determines predicted location information of the at least one UE for a first time point or a first time period according to the history location measurement information of the at least one UE.

In this step, the first time point or the first time period may be a future time point or a future time period. In other words, the step may be understood as follows: after obtaining the history location measurement information of the at least one UE in the MDT measurement information message in step S101, the location service network element determines, according to the history location measurement information of the at least one UE, the predicted location information of the at least one UE for a future time point or a future time period.

Optionally, the implementation is that the location service network element determines the predicted location information of the at least one UE for the first time point or the first time period according to the history location measurement information of the at least one UE and a current location of the at least one UE.

For example, the predicted location information may include at least one of latitude and longitude coordinates, an identifier of a cell at which the UE is located, altitude information, an identifier of a connected beam for a connected cell, or information of a tracking area where the UE is located, where one tracking area may include one or more cells.

At S103, the location service network element sends the predicted location information to the base station.

Because the location service network element may be a separate network element or a network element located inside the base station, the foregoing implementation may include the following different optional implementations.

When the location service network element is a separate network element, the location service network element sends, through the interface between the location service network element and the base station, the predicted location information to the base station. When the location service network element is a network element inside the base station, the location service network element sends, through the interface inside the base station, the predicted location information to a control plane of the base station.

Through the foregoing implementation, the location service network element may predict predicted location information of at least one UE at a specific time point or time period (for example, a first time point or a first time period) based on relevant history location data of the corresponding UE.

Figure 2:
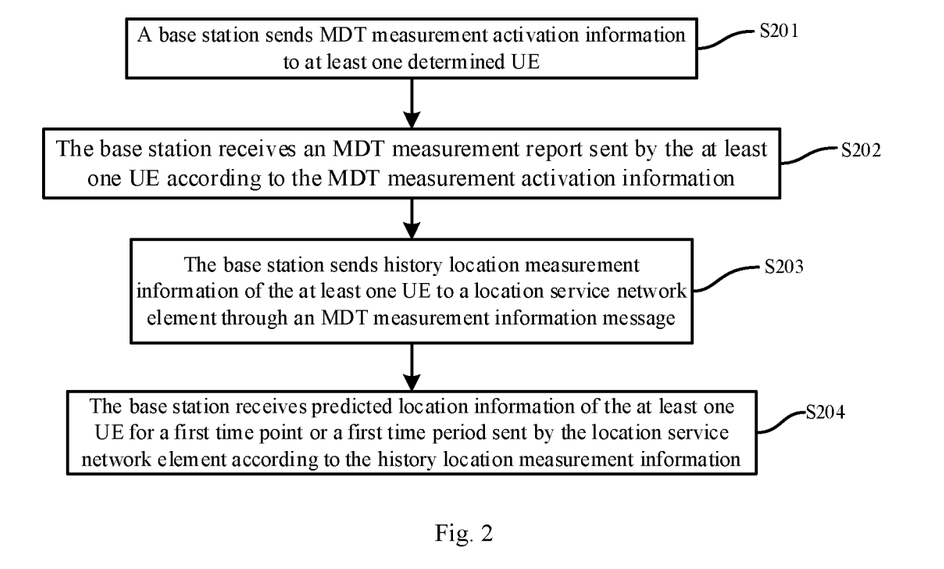
FIG. 2 is a flowchart of a location prediction method according to an embodiment.

FIG. 2 is a flowchart of a location prediction method according to an embodiment of the present disclosure. The method may be applied to a base station. As shown in FIG. 2, the method includes the following steps.

At S201, a base station sends MDT measurement activation information to at least one determined UE.

In an embodiment of the present disclosure, the base station may send the MDT measurement activation information to the at least one determined UE through an air interface. The MDT measurement activation information is used to instruct the at least one determined UE to perform location measurement.

Optionally, when the base station sends the MDT measurement activation information to the at least one determined UE through the air interface, the MDT measurement activation information may be carried in a Radio Resource Control (RRC) setup message or an RRC reconfiguration message. In other words, the base station sends the MDT measurement activation information to the at least one determined UE through the RRC setup message or the RRC reconfiguration message.

The MDT measurement activation information is used to instruct the at least one determined UE to perform relevant measurement, and the MDT measurement activation information may carry MDT location prediction measurement configuration information.

For example, the MDT location prediction measurement configuration information may include at least one of the following information: a location measurement cycle, a valid time for location prediction measurement configuration, whether to measure latitude and longitude coordinates, whether to measure and record an identifier of a connected cell, whether to measure a pilot fingerprint (for example, measurement values of strengths of specified pilot channels for a currently connected cell and several neighboring cells), whether to measure and record an identifier of a wireless local area network, whether to measure a difference between arrival times of positioning reference signals, measurement auxiliary data (for example, physical cell identifiers (PCIs) of the connected cell and the neighboring cells, cell identifiers, frequencies, or positioning reference signal configurations) for the positioning reference signals, or whether to measure and record a connected beam for the connected cell.

At S202, the base station receives an MDT measurement report sent by the at least one UE according to the MDT measurement activation information.

After receiving the MDT measurement activation information sent by the base station, the at least one determined UE in step S201 may perform corresponding measurement according to content in the MDT measurement activation information, and report a measurement result in a form of the MDT measurement report periodically or in response to a measurement report request of the base station or an event.

The base station receives the MDT measurement report sent by the at least one UE according to the MDT measurement activation information. The MDT measurement report includes history location measurement information of the at least one UE.

Optionally, the history location measurement information of the at least one UE May include at least one of the following information: latitude and longitude coordinates for at least one time point, an identifier of a connected cell for at least one time point, a pilot fingerprint measurement value for at least one time point, an identifier of a wireless local area network recorded for at least one time point, a difference between arrival times of positioning reference signals in a plurality of cells for at least one time point, and an identifier of a connected beam for the connected cell for at least one time point.

At S203, the base station sends the history location measurement information of the at least one UE to a location service network element through an MDT measurement information message.

After obtaining the history location measurement information in the MDT measurement report sent by the at least one UE, the base station may send the history location measurement information of the at least one UE to the location service network element through the MDT measurement information message.

Optionally, the location service network element may be a separate network element independent of the base station, or may be a network element disposed inside the base station. There are following two cases for implementation of step S203.

When the location service network element is a separate network element, the base station sends the MDT measurement information message to the location service network element through an interface between the base station and the location service network element. When the location service network element is a network element inside the base station, the base station sends, through an interface inside the base station, the MDT measurement information message to the location service network element.

At S204, the base station receives predicted location information of the at least one UE for a first time point or a first time period sent by the location service network element according to the history location measurement information.

After the base station sends the MDT measurement information message to the location service network element in step S203, the location service network element may determine the predicted location information of the at least one UE at the first time point or the first time period according to the history location measurement information of the at least one UE that is obtained through the MDT measurement information message, and then send the predicted location information to the base station.

The predicted location information of the at least one UE for the first time point or the first time period received by the base station may be predicted location information of the at least one UE at a future time point or in a future time period.

For example, the predicted location information may include at least one of the following information: latitude and longitude coordinates, an identifier of a cell where the UE is located, altitude information, an identifier of a connected beam for a connected cell, or information of a tracking area where the UE is located, where one tracking area may include one or more cells.

After receiving the predicted location information sent by the location service network element, the base station may perform connection management on the corresponding UE according to the predicted location information to balance network load. For example, the base station may select a load balancing target cell for handover of one UE according to predicted location information of the UE.

In an embodiment of the present disclosure, the at least one UE is determined by the base station. In an example, the base station may determine the at least one UE in the following implementation: the base station receives a first message sent by a core network, where the first message carries an indication of whether the at least one UE supports MDT predicted location measurement; further, the base station receives a second message sent by an Operations, Administration and Maintenance (OAM) node, where the second message carries information about a valid area for predicted locations; and then, the base station determines, according to the obtained information about the valid area, the at least one UE that supports the MDT predicted location measurement in the valid area.

For example, the first message may be an initial context setup request message or a handover request message for the UE initiated by a Core Access and Mobility Management Function (AMF) node through a Next Generation (NG) interface. The second message may be an MDT activation message sent by the OAM node through an interface connected to the base station, and the MDT activation message may be used to instruct the base station to enable an MDT function.

In an embodiment of the present disclosure, the order of sending the first message by the core network and sending the second message by the OAM node is not limited.

In an example, the base station may determine the at least one UE in the following implementation: the base station receives a third message sent by the core network, where the third message carries an instruction to activate MDT predicted location measurement for the UE; and the base station determines the at least one UE according to the third message.

The third message may be a UE initial context setup request message, a handover request message, a trace start message, or a trace activation message initiated by the core AMF node through the NG interface.

That the third message carries the instruction to activate MDT predicted location measurement for the UE may be understood that different third messages each carry an instruction to activate MDT predicted location measurement for a respective UE. For example, the base station receives three third messages sent by the core network, and the three third messages carry an instruction to activate MDT predicted location measurement for UE 1, an instruction to activate MDT predicted location measurement for UE 2, and an instruction to activate MDT predicted location measurement for UE 3, respectively. Then, the base station can determine at least one UE, namely, the UE 1, the UE 2, and the UE 3, based on the received three third messages.

Figure 3:
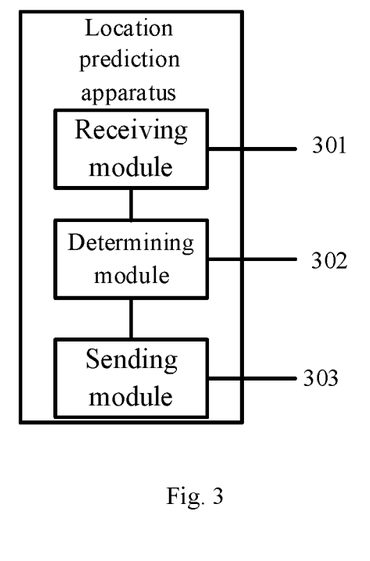
FIG. 3 is a schematic diagram of a location prediction apparatus according to an embodiment.

FIG. 3 is a schematic diagram of a location prediction apparatus according to an embodiment of the present disclosure. As shown in FIG. 3, the apparatus may include: a receiving module 301, a determining module 302, and a sending module 303.

The receiving module is configured to receive an MDT measurement information message sent by a base station, where the apparatus may be a separate apparatus or an apparatus inside the base station, and the MDT measurement information message carries history location measurement information of at least one UE, where the history location measurement information of the at least one UE includes at least one of the following: latitude and longitude coordinates for at least one time point, an identifier of a connected cell for at least one time point, a pilot fingerprint measurement value for at least one time point, an identifier of a wireless local area network recorded for at least one time point, a difference between arrival times of positioning reference signals in a plurality of cells for at least one time point, and an identifier of a connected beam for the connected cell for at least one time point.

The determining module is configured to determine predicted location information of the at least one UE for a first time point or a first time period according to the history location measurement information of the at least one UE.

The sending module is configured to send the predicted location information to the base station.

In an example, when the apparatus is a separate network element, the receiving module is configured to receive the MDT measurement information message sent by the base station through an interface between the apparatus and the base station.

In an example, when the apparatus is a network element inside the base station, the receiving module is configured to receive the MDT measurement information message sent by the base station through an interface inside the base station.

In an example, the determining module is configured to determine the predicted location information of the at least one UE for the first time point or the first time period according to the history location measurement information of the at least one UE and a current location of the at least one UE, where the predicted location information may include at least one of the following: latitude and longitude coordinates, an identifier of a cell where the UE is located, altitude information, an identifier of a connected beam for a connected cell, or information of a tracking area where the UE is located, where one tracking area may include one or more cells.

In an example, when the apparatus is a network element inside the base station, the sending module is configured to send the predicted location information to the base station through an interface between the apparatus and the base station.

In an example, when the apparatus is a network element inside the base station, the sending module is configured to send the predicted location information to a control plane of the base station through the interface inside the base station.

Figure 4:
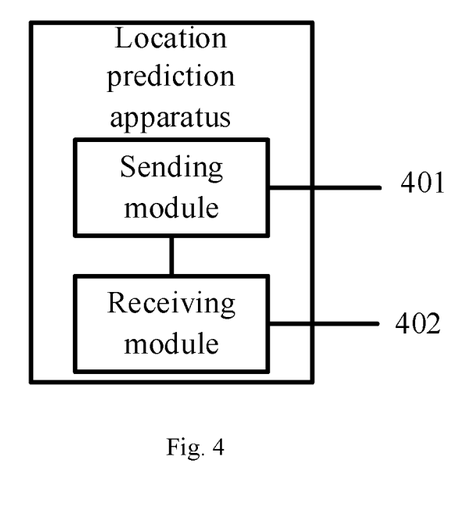
FIG. 4 is a schematic diagram of a location prediction apparatus according to an embodiment.

FIG. 4 is a schematic diagram of a location prediction apparatus according to an embodiment of the present disclosure. As shown in FIG. 4, the apparatus may include a sending module 401 and a receiving module 402.

The sending module is configured to send MDT measurement activation information to at least one determined UE. The MDT measurement activation information is used to instruct the at least one UE to perform location measurement.

The receiving module is configured to receive an MDT measurement report sent by the at least one UE according to the MDT measurement activation information, where the MDT measurement report includes history location measurement information of the at least one UE. The history location measurement information of the at least one UE includes at least one of the following: latitude and longitude coordinates for at least one time point, an identifier of a connected cell for at least one time point, a pilot fingerprint measurement value for at least one time point, an identifier of a wireless local area network recorded for at least one time point, a difference between arrival times of positioning reference signals in a plurality of cells for at least one time point, and an identifier of a connected beam for the connected cell for at least one time point.

The sending module is further configured to send the history location measurement information of the at least one UE to a location service network element through an MDT measurement information message, where the location service network element is a separate network element or a network element inside the location prediction apparatus.

The receiving module is further configured to receive predicted location information of the at least one UE for a first time point or a first time period sent by the location service network element according to the history location measurement information.

The predicted location information includes at least one of the following: latitude and longitude coordinates, an identifier of a cell where the UE is located, altitude information, an identifier of a connected beam for a connected cell, or information of a tracking area where the UE is located, where one tracking area may include one or more cells.

The apparatus may further include a determining module. The determining module is configured to determine at least one UE.

In an example, the receiving module is configured to receive a first message sent by a core network, where the first message carries an indication of whether the at least one UE supports MDT predicted location measurement. The receiving module is further configured to receive a second message sent by an OAM node, where the second message carries information about a valid area for predicted locations, and information about the valid area may include at least one of a cell list or a tracking area list, where one tracking area may include one or more cells. The determining module is configured to determine, according to the information about the valid area for predicted locations, the at least one UE that supports the MDT predicted location measurement in the valid area.

In an example, the receiving module is configured to receive a third message sent by a core network, where the third message carries an instruction to activate MDT predicted location measurement for the UE. The determining module is configured to determine the at least one UE according to the third message.

The sending module is configured to send the MDT measurement activation information to the at least one determined UE through an RRC setup message or an RRC reconfiguration message. The MDT measurement activation information carries MDT location prediction measurement configuration information, which includes at least one of the following: a location measurement cycle, a valid time for location prediction measurement configuration, whether to measure latitude and longitude coordinates, whether to measure and record an identifier of a connected cell, whether to measure a pilot fingerprint, whether to measure and record an identifier of a wireless local area network, whether to measure a difference between arrival times of positioning reference signals, measurement auxiliary data for the positioning reference signals, or whether to measure and record a connected beam for the connected cell.

When the location service network element is a separate network element, the sending module is configured to send the MDT measurement information message to the location service network element through an interface between the apparatus and the location service network element. When the location service network element is a network element inside the apparatus, the sending module is configured to send the MDT measurement information message to the location service network element through an internal interface of the apparatus.

Figure 5:
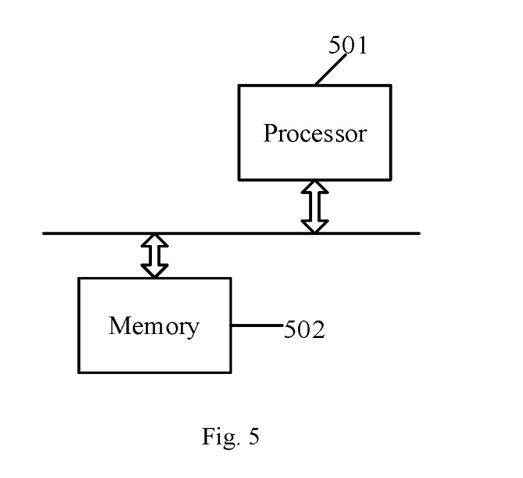
FIG. 5 is a schematic diagram of a network element according to an embodiment.

FIG. 5 is a schematic diagram of a network element according to an embodiment. As shown in FIG. 5, the network element includes a processor 501 and a memory 502. The number of processors 501 in the network element can be one or more, and one processor 501 is shown as an example in FIG. 5. The processor 501 and the memory 502 in the network element may be connected by a bus or by other means. In FIG. 5, the connection is realized by a bus as an example.

As a computer-readable storage medium, the memory 502 may be configured to store software programs, computer-executable programs and modules, such as program instructions/modules (for example, the receiving module 301, the determining module 302, and the sending module 303 in FIG. 3) corresponding to the location prediction method in the embodiment of FIG. 1. The processor 501 implements the above location prediction method by running the software programs, instructions and modules stored in the memory 502.

The memory 502 may mainly include a storage program area and a storage data area, where the storage program area may store an operating system and application program(s) required by at least one function, and the storage data area may store data created according to the use of a device, etc. In addition, the memory 502 may include a high-speed random access memory and a non-volatile memory, for example, at least one magnetic disk storage device, a flash memory device, or another non-volatile solid-state storage device.

Figure 6:
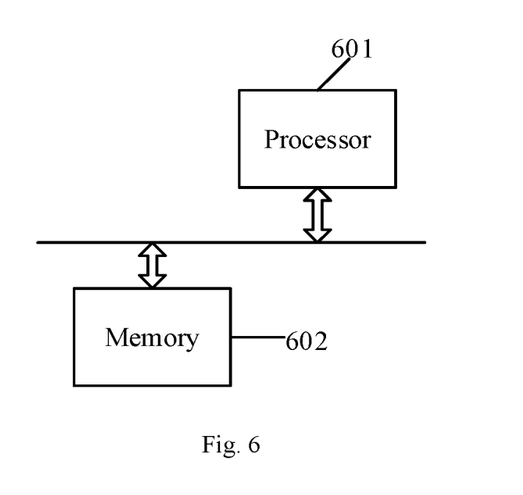
FIG. 6 is a schematic diagram of a base station according to an embodiment.

FIG. 6 is a schematic diagram of a base station according to an embodiment. As shown in FIG. 6, the base station includes a processor 601 and a memory 602. The number of processors 601 in the base station can be one or more, and one processor 601 is shown as an example in FIG. 6. The processor 601 and the memory 602 in the base station may be connected by a bus or by other means. In FIG. 6, the connection is realized by a bus as an example.

As a computer-readable storage medium, the memory 602 may be configured to store software programs, computer-executable programs and modules, such as program instructions/modules (for example, the sending module 401 and the receiving module 402 in FIG. 4) corresponding to the location prediction method in the embodiment of FIG. 2. The processor 601 implements the above location prediction method by running the software 25 programs, instructions and modules stored in the memory 602.

The memory 602 may mainly include a storage program area and a storage data area, where the storage program area may store an operating system and application program(s) required by at least one function, and the storage data area may store data created according to the use of a device, etc. In addition, the memory 602 may include a high-speed random access memory and a non-volatile memory, for example, at least one magnetic disk storage device, a flash memory device, or another non-volatile solid-state storage device.

A further embodiment of the present disclosure provides a storage medium including computer-executable instructions which, when executed by a computer processor, cause a location prediction method to be performed, where the method includes: receiving, by a location service network element, MDT measurement information message sent by a base station, where the location service network element is a separate network element or a network element inside the base station, and the MDT measurement information message carries history location measurement information of at least one UE; determining, by the location service network element, predicted location information of the at least one UE for a first time point or a first time period according to the history location measurement information of the at least one UE; and sending, by the location service network element, the predicted location information to the base station.

A further embodiment of the present disclosure provides a storage medium including computer-executable instructions which, when executed by a computer processor, cause a location prediction method to be performed, where the method includes: sending, by a base station, MDT measurement activation information to at least one determined UE, where the MDT measurement activation information is used to instruct the at least one UE to perform location measurement; receiving, by the base station, an MDT measurement report sent by the at least one UE according to the MDT measurement activation information, where the MDT measurement report includes history location measurement information of the at least one UE; sending, by the base station, the history location measurement information of the at least one UE to a location service network element through an MDT measurement information message, where the location service network element is a separate network element or a network element inside the base station; and receiving, by the base station, predicted location information of the at least one UE for a first time point or a first time period sent by the location service network element according to the history location measurement information.

The above-described embodiments are only illustrative implementations of the present disclosure, and are not intended to limit the scope of protection of the present disclosure.

Generally speaking, various embodiments of the present disclosure can be implemented in hardware or dedicated circuits, software, logic or any combination thereof. For example, some aspects can be implemented in hardware, while other aspects can be implemented in firmware or software that can be executed by a controller, a microprocessor or another computing device. However, the present disclosure is not limited thereto.

Embodiments of the present disclosure can be implemented by a data processor of a location prediction apparatus executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure can represent program steps, or can represent interconnected logic circuits, modules and functions, or can represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A location prediction method, comprising:
    receiving, by a location service network element, a Minimization of Drive Tests (MDT) measurement information message sent by a base station, wherein the location service network element is a separate network element or a network element inside the base station, and the MDT measurement information message carries history location measurement information of at least one user equipment (UE);
    determining, by the location service network element, predicted location information of the at least one UE for a first time point or a first time period according to the history location measurement information of the at least one UE; and
    sending, by the location service network element, the predicted location information to the base station.

2. The method of claim 1, wherein receiving, by a location service network element, MDT measurement information message sent by a base station comprises:
    when the location service network element is a separate network element, receiving, by the location service network element through an interface between the location service network element and the base station, the MDT measurement information message sent by the base station; or
    when the location service network element is a network element inside the base station, receiving, by the location service network element through an interface inside the base station, the MDT measurement information message sent by the base station.

3. The method of claim 1, wherein the history location measurement information of the at least one UE comprises at least one of:
    latitude and longitude coordinates for at least one time point,
    an identifier of a connected cell for at least one time point,
    a pilot fingerprint measurement value for at least one time point,
    an identifier of a wireless local area network recorded for at least one time point,
    a difference between arrival times of positioning reference signals in a plurality of cells for at least one time point, or
    an identifier of a connected beam for the connected cell for at least one time point.

4. The method of claim 1, wherein determining, by the location service network element, predicted location information of the at least one UE for a first time point or a first time period according to the history location measurement information of the at least one UE comprises:
    determining, by the location service network element, the predicted location information of the at least one UE for the first time point or the first time period according to the history location measurement information of the at least one UE and a location of the at least one UE.

5. The method of claim 1, wherein the predicted location information comprises at least one of:
    latitude and longitude coordinates, an identifier of a cell where the UE is located, altitude information, an identifier of a connected beam for a connected cell, or information of a tracking area where the UE is located, where one tracking area includes at least one cell.

6. The method of claim 1, wherein sending, by the location service network element, the predicted location information to the base station comprises:
    when the location service network element is a separate network element, sending, by the location service network element through the interface between the location service network element and the base station, the predicted location information to the base station; or
    when the location service network element is a network element inside the base station, sending, by the location service network element through an interface inside the base station, the predicted location information to a control plane of the base station.

7. A network element, comprising:
    a memory, a processor, and a computer program stored in the memory and executable by the processor, wherein the processor implements the location prediction method of claim 1 when executing the computer program.

8. A non-transitory computer-readable storage medium storing a computer program which, when executed by a processor, causes the processor to implement the location prediction method of claim 1.

9. A location prediction method, comprising:
sending, by a base station, Minimization of Drive Tests (MDT) measurement activation information to at least one determined user equipment (UE), wherein the MDT measurement activation information is used to instruct the at least one UE to perform location measurement;
receiving, by the base station, an MDT measurement report sent by the at least one UE according to the MDT measurement activation information, wherein the MDT measurement report includes history location measurement information of the at least one UE;
sending, by the base station, the history location measurement information of the at least one UE to a location service network element through an MDT measurement information message, wherein the location service network element is a separate network element or a network element inside the base station; and
receiving, by the base station, predicted location information of the at least one UE for a first time point or a first time period sent by the location service network element according to the history location measurement information.

10. The method of claim 9, wherein determining, by the base station, the at least one UE comprises:
receiving, by the base station, a first message sent by a core network, wherein the first message carries an indication of whether the at least one UE supports MDT predicted location measurement;
receiving, by the base station, a second message sent by an Operations, Administration and Maintenance (OAM) node, wherein the second message carries information about a valid area for predicted locations; and
determining, by the base station according to the information about the valid area for predicted locations, the at least one UE which supports the MDT predicted location measurement in the valid area.

11. The method of claim 9, wherein determining, by the base station, the at least one UE comprises:
receiving, by the base station, a third message sent by a core network, wherein the third message carries an instruction to activate MDT predicted location measurement for UE; and
determining, by the base station, the at least one UE according to the third message.

12. The method of claim 10, wherein the information about the valid area includes at least one of:
a cell list, or
a tracking area list, wherein one tracking area includes at least one cell.

13. The method of claim 9, wherein sending, by a base station, MDT measurement activation information to at least one determined UE comprises:
sending, by the base station, the MDT measurement activation information to the at least one determined UE through a radio resource control (RRC) setup message or an RRC reconfiguration message.

14. The method of claim 13, wherein the MDT measurement activation information carries MDT location prediction measurement configuration information comprising at least one of:
a location measurement cycle,
a valid time for location prediction measurement configuration,
whether to measure latitude and longitude coordinates,
whether to measure and record an identifier of a connected cell, whether to measure a pilot fingerprint,
whether to measure and record an identifier of a wireless local area network,
whether to measure a difference between arrival times of positioning reference signals,
measurement auxiliary data for the positioning reference signals, or
whether to measure and record a connected beam for the connected cell.

15. The method of claim 9, wherein sending, by the base station, the history location measurement information of the at least one UE to a location service network element through an MDT measurement information message comprises:
when the location service network element is a separate network element, sending, by the base station, the MDT measurement information message to the location service network element through an interface between the base station and the location service network element, or
when the location service network element is a network element inside the base station, sending, by the base station through an interface inside the base station, the MDT measurement information message to the location service network element.

16. The method of claim 15, wherein the history location measurement information of the at least one UE comprises at least one of:
latitude and longitude coordinates for at least one time point,
an identifier of a connected cell for at least one time point,
a pilot fingerprint measurement value for at least one time point,
an identifier of a wireless local area network recorded for at least one time point,
a difference between arrival times of positioning reference signals in a plurality of cells for at least one time point, or
an identifier of a connected beam for the connected cell for at least one time point.

17. The method of claim 9, wherein the predicted location information comprises at least one of:
latitude and longitude coordinates,
an identifier of a cell where the UE is located,
altitude information,
an identifier of a connected beam for a connected cell, or
information of a tracking area where the UE is located, where one tracking area includes at least one cell.

18. A base station, comprising: a memory, a processor, and a computer program stored in the memory and executable by the processor, wherein the processor implements the location prediction method of claim 9 when executing the computer program.

19. A non-transitory computer-readable storage medium storing a computer program which, when executed by a processor, causes the processor to implement the location prediction method of claim 9.

\* \* \* \* \*